(12) United States Patent
Stewart

(10) Patent No.: US 7,791,615 B2
(45) Date of Patent: Sep. 7, 2010

(54) PROCESSING OF IMAGE DATA

(75) Inventor: Brian Stewart, Edinburgh (GB)

(73) Assignee: STMicroelectronics (Research & Development) Ltd., Marlow-Buckinghamshire (GB)

( * ) Notice: Subject to any disclaimer, the term of this patent is extended or adjusted under 35 U.S.C. 154(b) by 665 days.

(21) Appl. No.: 11/743,446

(22) Filed: May 2, 2007

(65) Prior Publication Data

US 2007/0285432 A1 Dec. 13, 2007

(30) Foreign Application Priority Data

May 3, 2006 (EP) .................................. 06009116

(51) Int. Cl.
*G09G 5/02* (2006.01)
*H04N 5/228* (2006.01)

(52) U.S. Cl. .................................... 345/589; 348/222.1

(58) Field of Classification Search .............. 348/222.1; 345/589–605; 382/162, 167
See application file for complete search history.

(56) References Cited

U.S. PATENT DOCUMENTS

| 6,366,692 B1 | 4/2002 | Acharya | 382/162 |
| 7,170,529 B2 * | 1/2007 | Chang | 345/604 |
| 7,623,141 B2 * | 11/2009 | Brown Elliott et al. | 345/690 |
| 2003/0103058 A1 * | 6/2003 | Hellen Brown Elliot et al. | 345/589 |
| 2004/0085458 A1 | 5/2004 | Yanof et al. | 348/223.1 |
| 2006/0215908 A1 * | 9/2006 | Kamon et al. | 382/167 |

FOREIGN PATENT DOCUMENTS

EP 0729278 8/1996

OTHER PUBLICATIONS

Toi, Color Signal Processing Technique for Single-Chip CCD Cameras that Employ CPUS with SIMD instructions Sets, IEEE Transactions on Consumer Electronics, IEEE Service Center, New York, NY, US, vol. 46, No, 2, May 2000, pp. 291-294.

Leacock et al., An HDTV Digital Camera Processor, SMPTE Journal, SMPTE Inc., Scarsdale, NY, US, vol. 103, No. 9, Sep. 1, 1994, pp. 580-585.

* cited by examiner

*Primary Examiner*—Ryan R Yang
(74) *Attorney, Agent, or Firm*—Lisa K. Jorgenson; Allen, Dyer, Doppelt, Milbrath & Gilchrist, P.A.

(57) ABSTRACT

A method of processing image data produced by a solid state image sensor that is overlaid with a color filter array is based on range scaling, demosaicing, matrixing, range clipping and gamma correction being performed in two data collection passes. The demosaicing can be performed with pixels grouped in 2×2 blocks, or quads.

29 Claims, 4 Drawing Sheets

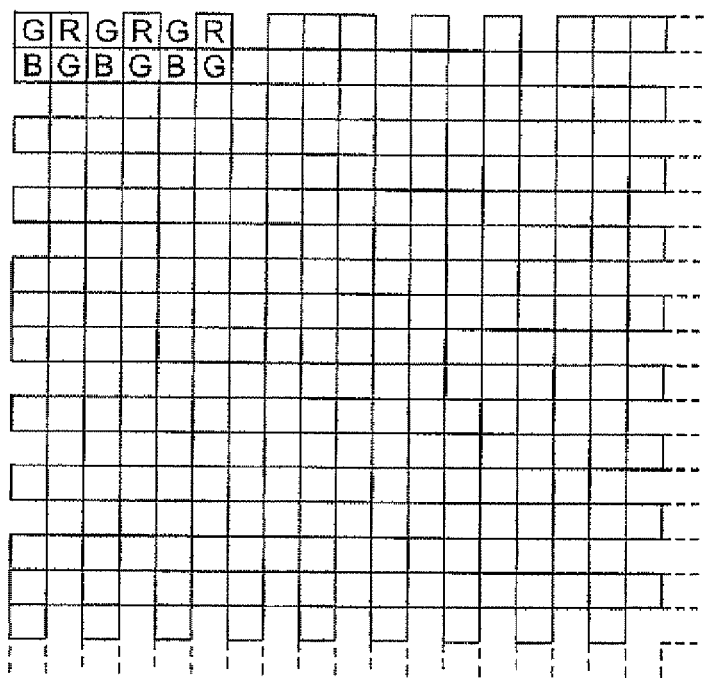
Fig. 3
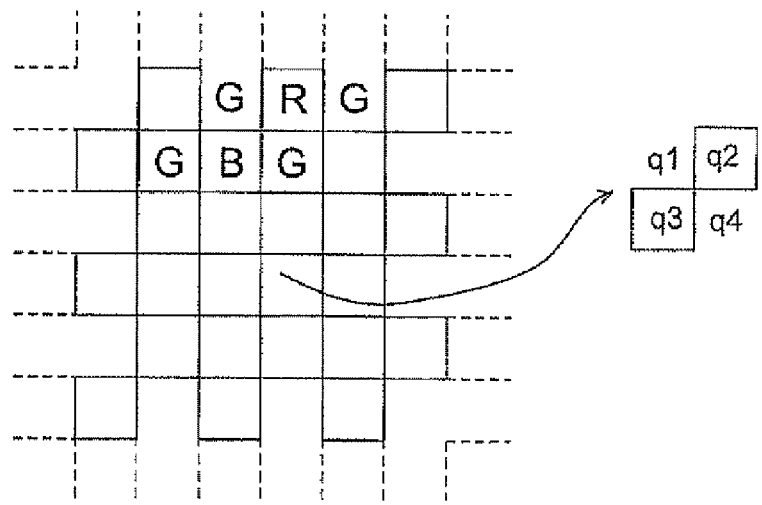
Fig. 4
Fig. 5
$$red = \frac{(2r_1 + r_2 + r_3)}{4}$$
Fig. 6
$$blue = \frac{(2b_1 + b_2 + b_3)}{4}$$

$$\text{green}_{q1} = g1$$

$$\text{green}_{q2} = \frac{(g1+g2+g3+g4)}{4}$$

$$\text{green}_{q3} = \frac{(g1+g4+g5+g6)}{4}$$

$$\text{green}_{q4} = g1$$

| 0000-00FF | 0100-0FFF | 1000-7FFF | 8000-F000 | F0001-FFFF |
|---|---|---|---|---|
| 0 to 255 | 256 to 4095 | 4095 to 32767 | -32768 to -4096 | -1 to -4095 |
| Valid | Overflow | Not used | Not used | Underflow |

Fig. 8

PROCESSING OF IMAGE DATA

FIELD OF THE INVENTION

The invention relates to a method and apparatus for processing color picture signals, and more particularly, to the processing of color video (moving picture) signals from solid state image sensors, including applications to other forms of picture signals.

BACKGROUND OF THE INVENTION

In solid state image sensors providing color images, an array of pixels is overlaid with a pattern of color filters. One common pattern is the Bayer pattern in which alternate rows are G, R, G, R . . . and B, G, B, G . . . . It is usual for the output from the image sensor to be processed to give RGB values for each pixel.

In the prior art such processing is carried out in hardware and known approaches make different trade-offs between image quality and computational load or circuit complexity. See, for example, U.S. Pat. No. 6,757,012 (Hubena et al.), U.S. Pat. No. 5,008,739 (D'Luna et al.) and U.S. Pat. No. 3,971,065 (Bayer et al.).

SUMMARY OF THE INVENTION

In view of the foregoing background, an object of the invention is to reduce the computation in processing image data.

The computation can be carried out either by software, or by hardware, such as in an ASIC implementation, for example. In software, less computation power and/or better image quality are provided. In hardware, lower operational power and reduced silicon design area are provided.

This and other objects, advantages and features in accordance with the invention are provided by a method of processing image data produced by a solid state image sensor having a color filter array of pixels to produce three-component color signals for each pixel. The method comprises performing at least range scaling and demosaicing in a first single pass of pixel image data, and performing at least matrixing, range clipping and gamma correction in a second single pass of the pixel image data.

The first pass may additionally include collection of white balance statistics, and the second pass may additionally include application of white balance correction. The white balance statistics gathering of the first pass may be performed only on a sample of the pixel data from selected pixels. The sampling may suitably be between 1:4 and 1:16 linearly.

Range scaling may be performed by use of a look-up table applied as a transform to pixel values as they are retrieved for demosaicing.

In a typical embodiment the color filter array may be an RBG Bayer pattern. The demosaicing may be performed on 2×2 blocks or quads each containing two green, one red, and one blue pixel. A single red value may be calculated and applied to all pixels of the quad, and a single blue value may be calculated and applied to all pixels of the quad.

The single red value may conveniently be calculated as $(2r_1+r_2+r_3)/4$, where $r_1$ is the value from the red pixel within the quad and $r_2$ and $r_3$ are the values from red pixels adjacent the quad. The single blue value may conveniently be calculated as $(2b_1+b_2+b_3)/4$, where $b_1$ is the value from the blue pixel within the quad and $b_2$ and $b_3$ are the values from blue pixels adjacent the quad.

White balancing and matrixing may be performed by a single operation, and the single red and blue values may be used in performing white balancing and matrixing.

The combined white balancing and matrixing may be preceded by testing to determine whether clipping to a saturated value is required. The testing suitably comprises testing each color component value of each pixel against a pre-calculated value for that color. The pre-calculated values are preferably derived from white balance gain values.

Clipping and gamma correction may be performed as a single operation by reference to a look-up table. The look-up table may be organized such that negative input values wrap to high (negative) values of an unsigned short value.

Another aspect of the invention is directed to an apparatus for processing image data produced by a solid state image sensor having a color filter array of pixels to produce three-component color signals for each pixel. The apparatus comprises range scaling and demosaicing means or circuitry to receive the image data and to perform range scaling and demosaicing in a first single pass of the pixel image data. Matrixing, range clipping and gamma correction means or circuitry receive the output of the range scaling and demosaicing means and are adapted to performing at least matrixing, range clipping and gamma correction in a second single pass of the pixel image data.

Yet another aspect of the invention is directed to a solid state image sensor comprising a color filter array of pixels providing three-component color signals for each pixel, and an image processing apparatus as defined above. The color filter array may be a red/green/blue Bayer pattern.

BRIEF DESCRIPTION OF THE DRAWINGS

An embodiment of the invention will now be described, by way of example only, with reference the drawings, in which:

FIG. 3 shows sampling of part of a pixel array according to the present invention;

FIG. 4 illustrates the division of the color filter array into quads according to the present invention;

FIG. 5 illustrates the derivation of red values for the four pixels of the quad according to the present invention;

FIG. 6 illustrates the derivation of blue values for the four pixels of the quad according to the present invention;

FIG. 8 illustrates the structure of a look-up table used in part of the method according to the present invention.

DETAILED DESCRIPTION OF THE PREFERRED EMBODIMENTS

Figure 1:
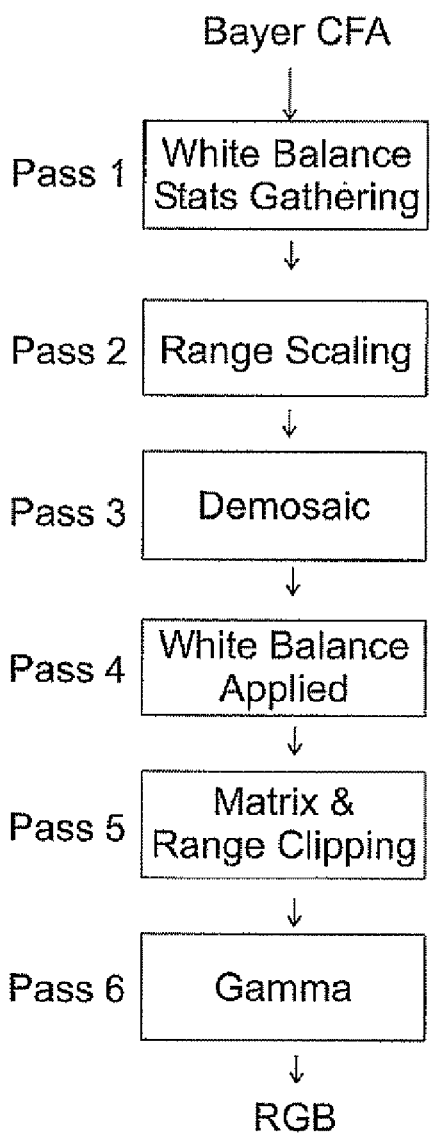
FIG. 1 illustrates a prior art process.

Referring to FIG. 1, a flow chart for a conventional process of converting Bayer Color Filter Array (CFA) signals to RGB signals for each pixel is shown. The process comprises separate steps of gathering white balance statistics, range scaling, demosaicing, applying white balance, matrix and range clipping, and gamma correction.

This process has the advantage that it is entirely modular, and thus the steps can be implemented and modified independently. However, it has the disadvantage that each step requires a complete pass through the entire image. Each of these passes implies data retrieval which, in the absence of a large cache, implies multiple accesses to/from the main memory, often to the same data. The main memory may be characterized as a computer-readable storage medium, for example, having computer-executable instructions stored thereon for causing an image processing apparatus to operate accordingly. This puts limits on the speed and/or accuracy of the process, or requires additional computational hardware.

Turning to the present invention, the preferred embodiment will be described with reference to a software implementation. This embodiment is based on three assumptions.

The main assumption for software video processing (soft-vp) implementations is that image quality can be sacrificed as the task of creating a high-quality still will be undertaken by a different algorithm. High quality stills processing will be known as soft-stills processing or soft-sp. Execution time for soft-vp is important, and hence, algorithmic and implementation efficiency.

It is a further assumption that soft-vp implementation will have access to memory for storing look-up tables (LUTs) that are used to store the results for partial calculation, etc. The required LUT memory in the present example is 64 Kbytes+ 256 bytes. These LUTs can be replaced by calculations if the necessary LUT memory is not available on the host system. This will, however, degrade performance in terms of execution time.

A last assumption is that the data can be processed from 8-bit pixel samples. If greater bit-depth than this is required, then this is possible. There would be little or no degradation in performance. However, the 256 byte LUT would needed to increase in size in line with the bit-depth desired.

The present implementation can be written in ANSI 'C' without making use of an assembler. This choice maintains a good degree of portability across host platforms. Obviously, optimization through targeted use of a specific host assembler would lead to improvements in efficiency in terms of execution speed.

Figure 2:
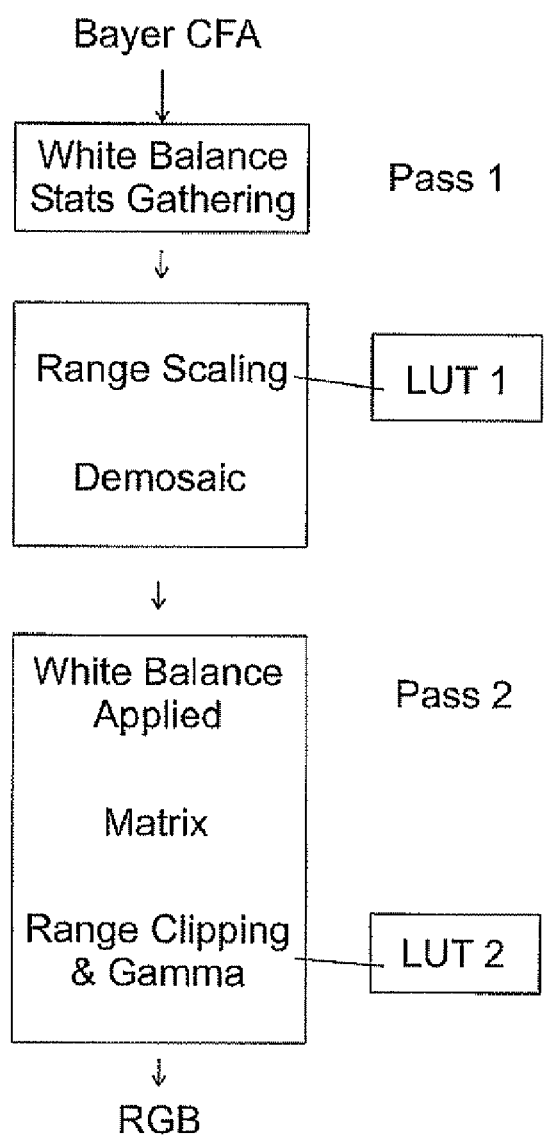
FIG. 2 is an overview of one process according to the present invention.

FIG. 2 gives an overview of one embodiment of the invention. In this process, only two passes through the pixel data are required. The first pass makes use of only a sample of the pixels, while the second pass uses all pixels. The first pass makes use of a first look-up table LUT1, and the second pass makes use of a second look-up table LUT2.

Each of the steps of FIG. 2 will now be described in detail.

First Pass: Stats Gathering for White-Balance. To compensate the image for the color of the illuminating light source, color channel gains are calculated and applied later in the process. The statistics required to calculate the color channel gains are gathered first. This is done by accumulating the energy in each of the color channels from all pixels which are not saturated. In the interests of reducing computational load, this statistics gathering is not applied to every pixel, rather a subsampled image is used instead.

The sampling depends on the original image size to a certain extent in that after subsampling there should be enough data from which to derive a statistically relevant assessment of the color channel energies. A sampling of 8× or 16× is usually sufficient in an image of vga dimensions (640× 480). The sampled pixels are arranged as seen in FIG. 3 (example shown for 4×).

It should be noted that only one of the two greens in a particular 2×2 is used. This therefore assumes that both green dyes are the same or similar. If none of the red, green and blue pixel values are saturated, then channel energies are accumulated as follows:

$$r_{Acc} = \sum_{x,y} \left| \begin{array}{ll} \text{Min}(r_{x,y}, g_{x,y}, b_{x,y})r_{x,y} & \text{if } r_{x,y} < I_{Sat} \text{ and} \\ & g_{x,y} < I_{Sat} \text{ and } b_{x,y} < I_{Sat} \\ 0 & \text{otherwise} \end{array} \right. \quad \text{i}$$

$$g_{Acc} = \sum_{x,y} \left| \begin{array}{ll} \text{Min}(r_{x,y}, g_{x,y}, b_{x,y})g_{x,y} & \text{if } r_{x,y} < I_{Sat} \text{ and} \\ & g_{x,y} < I_{Sat} \text{ and } b_{x,y} < I_{Sat} \\ 0 & \text{otherwise} \end{array} \right.$$

$$b_{Acc} = \sum_{x,y} \left| \begin{array}{ll} \text{Min}(r_{x,y}, g_{x,y}, b_{x,y})b_{x,y} & \text{if } r_{x,y} < I_{Sat} \text{ and} \\ & g_{x,y} < I_{Sat} \text{ and } b_{x,y} < I_{Sat} \\ 0 & \text{otherwise} \end{array} \right.$$

Once channel energies are accumulated, the channel gains are calculated as follows:

$$G_r = \frac{\text{Max}(r_{Acc}, g_{Acc}, b_{Acc})}{r_{Acc}} \quad \text{ii}$$

$$G_g = \frac{\text{Max}(r_{Acc}, g_{Acc}, b_{Acc})}{g_{Acc}}$$

$$G_b = \frac{\text{Max}(r_{Acc}, g_{Acc}, b_{Acc})}{b_{Acc}}$$

In terms of complexity the statistics gathering takes 6 tests and 3 multiplications per red/green/blue triplet. The subsampling used dictates the number of triplets considered.

Second Pass: Range Scaling. The first process after gathering stats is range scaling. This compensates for black-level and saturation points and can be used to scale the capture pixel data to a known range. The formulae iii describes the process.

$$I' = \left| \begin{array}{ll} I - B_L & \text{if } I > B_L \\ 0 & \text{if } I \leq B_L \end{array} \right. \quad \text{iii}$$

$$I'' = \frac{(I'S_c + 129)}{256} \text{ where}$$

$$S_c = \frac{256(\text{Max} - \text{Min})}{(I_{Sat} - B_L)}$$

Max and Min are the maximum and minimum values desired in the output range. $I_{Sat}$ is the saturation value of the input data (generally 254), while $B_L$ is the black-level of the input data. The constants are correct for 8-bit input and output data widths. Importantly, from an efficiency point of view this range scaling can be implemented in an LUT. For 8-bit data a 256 byte LUT is required, where all the possible input values are converted to the re-scaled range. In this way the single lookup per pixel replaces the following 5 operations per pixel: 1 test, 2 additions, 1 multiplication, 1 shift.

In the present implementation the LUT for scaling is consulted as the pixel values are retrieved from memory for the demosaic process. Demosaic is described next.

Demosaic. The Bayer array is processed in blocks of 2×2, or quads. FIG. 4 shows an array in which one quad is highlighted. This contains four pixels q1-q4, of which q1 and q4 are green, q2 is red and q3 is blue. Processing occurs in order to generate a red, green and blue channel pixel value for each and every pixel location. This is done by first calculating a red and blue value for the entire quad.

With reference to FIG. 5, the red value for each pixel is calculated from the value of the red pixel within the quad plus the values of the adjacent red pixels as follows:

$$red = \frac{(2r_1 + r_2 + r_3)}{4}$$

This requires 3 data access, 2 shifts, 5 additions=10 ops. Similarly, with reference to FIG. 6, the blue value for each pixel is calculated from the value of the blue pixel within the quad plus the values of the adjacent blue pixels as follows:

$$blue = \frac{(2b_1 + b_2 + b_3)}{4}$$

Figure 7:
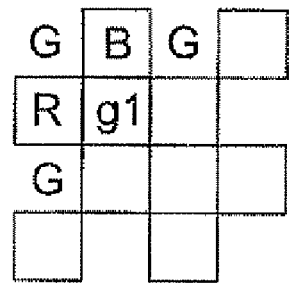
FIG. 7 shows handling of green values for the quad according to the present invention.
Figure 7:
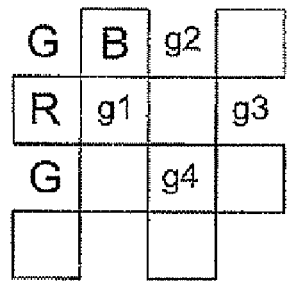
Figure 7:
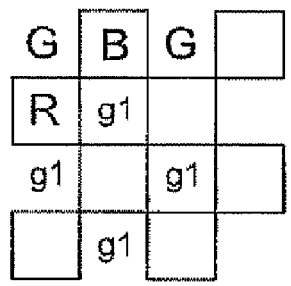
Figure 7:
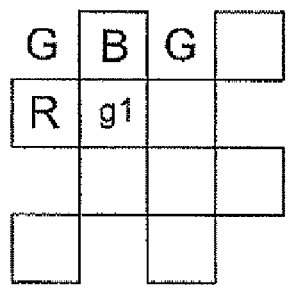

Which again requires 3 data access, 2 shifts, 5 additions=10 ops. For each pixel in the quad there is now a red and blue component calculated, and a green component remains to be calculated. There are four pixels in the quad and each green component is calculated as follows, with reference to FIG. 7.

$$green_{q1} = g1 \qquad \text{1 data access} = 1 \; op$$

$$green_{q2} = \frac{(g1 + g2 + g3 + g4)}{4} \qquad \begin{array}{l}\text{4 data access, 6 additions,}\\ \text{1 shift} = 11 \; ops\end{array}$$

$$green_{q3} = \frac{(g1 + g4 + g5 + g6)}{4} \qquad \begin{array}{l}\text{4 data access, 6 additions,}\\ \text{1 shift} = 11 \; ops\end{array}$$

$green_{q4} = g1$  1 data access=1 op

The overall output of the pixels in the given quad is:

q1rgb=red, $green_{q1}$, blue q2rgb=red, $green_{q2}$, blue q3rgb=red, $green_{q3}$, blue q4rgb=red, $green_{q4}$, blue  iv In terms of operations per pixel this takes:

(10+10)/4=5 for red and blue (1+11+11+1)/4=6 for greens total=11 ops per pixel

White Balance and Matrix. The next two steps in processing, the application of white balancing gains and matrixing to correct the color rendition of the CFA dyes are both done together within one set of arithmetic calculations.

White balance gains are applied as follows:

$$\begin{bmatrix} r' \\ g' \\ b' \end{bmatrix} = \begin{bmatrix} G_r & & \\ & G_g & \\ & & G_b \end{bmatrix} \begin{bmatrix} r \\ g \\ b \end{bmatrix} \qquad v$$

while matrixing is applied as follows:

$$\begin{bmatrix} r'' \\ g'' \\ b'' \end{bmatrix} = \begin{bmatrix} m_{0,0} & m_{0,1} & m_{0,2} \\ m_{1,0} & m_{1,1} & m_{1,2} \\ m_{2,0} & m_{2,1} & m_{2,2} \end{bmatrix} \begin{bmatrix} r' \\ g' \\ b' \end{bmatrix} \qquad vi$$

By combining these two matrix multiplications we have:

$$\begin{bmatrix} r'' \\ g'' \\ b'' \end{bmatrix} = \begin{bmatrix} m_{0,0} & m_{0,1} & m_{0,2} \\ m_{1,0} & m_{1,1} & m_{1,2} \\ m_{2,0} & m_{2,1} & m_{2,2} \end{bmatrix} \begin{bmatrix} G_r & & \\ & G_g & \\ & & G_b \end{bmatrix} \begin{bmatrix} r \\ g \\ b \end{bmatrix} \qquad vii$$

$$\begin{bmatrix} r'' \\ g'' \\ b'' \end{bmatrix} = \begin{bmatrix} m_{0,0}G_r & m_{0,1}G_g & m_{0,2}G_b \\ m_{1,0}G_r & m_{1,1}G_g & m_{1,2}G_b \\ m_{2,0}G_r & m_{2,1}G_g & m_{2,2}G_b \end{bmatrix} \begin{bmatrix} r \\ g \\ b \end{bmatrix} \qquad viii$$

By multiplying this out we obtain:

$r'' = m_{0,0}G_r r + m_{0,1}G_g g + m_{0,2}G_b b$ $g'' = m_{1,0}G_r r + m_{1,1}G_g g + m_{1,2}G_b b$ $b'' = m_{2,0}G_r r + m_{2,1}G_g g + m_{2,2}G_b b$  ix

So, rather than 12 multiplications to implement both matrix and white balance, we can use only 9. Then there are further savings to be had by noting that the red and blue values are the same for all pixels in a quad. This means that the following terms are identical for all four pixels in the quad, and therefore need only be calculated once rather than four times:

$m_0 G_{rb} = m_{0,0}G_r r + m_{0,2}G_b b$ $m_1 G_{rb} = m_{1,0}G_r r + m_{1,2}G_b b$ $m_2 G_{rb} = m_{2,0}G_r r + m_{2,2}G_b b$  x

So we have the 6 multiplications above plus 3 multiplications for each of the pixels in the quad. This is the equivalent of 18 multiplications for all four pixels, only 4.5 multiplications per pixel. Less than half the 12 multiplications are required by equation vii.

Caveat—by combining the white balance and matrix step into one calculation we risk introducing a color cast in saturated regions of the image. This is because the negative components of the color compensation matrix together with the white-balance gains can combine to produce an overall gain for a given color channel which is less than unity.

Applying a gain which is less than unity to a saturated region leads to color casting. Furthermore, the application of gain on its own can push a value into saturation, and from this point on the pixel should be considered saturated. If it is not the subsequent application of matrix can pull the value back below saturation. To avoid these problems, some additional testing needs to be introduced to the above calculation.

Essentially, we are required to check that the application of gain will not push the pixel into saturation and if it does, clip to that saturated value for the result of white-balance before applying matrix correction. Herein lies the problem. The above equations combine both white-balance and matrix, and there is no opportunity to apply the clip. The approach is to test whether the white-balance pixel values will clip. If they do, then clip the value and apply the matrix calculation as per equation vi. If they do note the simplified calculations detailed by equation ix and equation x are applied.

The testing for a clipped value could be expensive computationally, but the value against which to test all pixels can be pre-calculated from the white-balance gains. On a per pixel basis, it remains only to test against this pre-calculated set of values for red, green and blue. In the worst case, this testing costs up to 3 multiplications and 4 comparisons per pixel. The equations are shown below . . . .

The limits are given by . . . .

$$R_{Limit} = 261120/(1024 G_r)$$

$$G_{Limit} = 261120/(1024 G_g)$$

$$B_{Limit} = 261120/(1024 G_b) \quad \text{xi}$$

If $g > G_{Limit}$ then we have the following . . .

$$t_g = \begin{vmatrix} 1024 G_g g & \text{if } g > G_{Limit} \\ 261120 & \text{otherwise} \end{vmatrix} \quad \text{xii}$$

$$t_r = \begin{vmatrix} 1024 G_r r & \text{if } r > R_{Limit} \\ 261120 & \text{otherwise} \end{vmatrix}$$

$$t_b = \begin{vmatrix} 1024 G_b b & \text{if } b > B_{Limit} \\ 261120 & \text{otherwise} \end{vmatrix}$$

$$r'' = m_{0,0} t_r + m_{0,1} t_g + m_{0,2} t_b$$

$$g'' = m_{1,0} t_r + m_{1,1} t_g + m_{1,2} t_b$$

$$b'' = m_{2,0} t_r + m_{2,1} t_g + m_{2,2} t_b$$

. . . otherwise, from equations ix and x . . . .

$$r'' = m_0 G_{rb} + m_{0,1} G_g g$$

$$g'' = m_1 G_{rb} + m_{1,1} G_g g$$

$$b'' = m_2 G_{rb} + m_{2,1} G_g g \quad \text{xiii}$$

The extra multiplications and comparisons required are worst case and where g is below the $G_{Limit}$ then the overhead reduces to only one comparison per pixel. The compromise resolves to this. For a well exposed image with little or no saturated regions the computational complexity resolves to equation xiii.

Range Clipping and Gamma. Both range clipping and gamma correction can be done with one LUT. The arithmetic calculations required are as follows:

Clipping $$r''_{clipped} = \begin{vmatrix} I_{Clip} & \text{if } r > I_{Clip} \\ 0 & \text{if } r < 0 \\ r'' & \text{otherwise} \end{vmatrix}$$

$$g''_{clipped} = \begin{vmatrix} I_{Clip} & \text{if } g > I_{Clip} \\ 0 & \text{if } g < 0 \\ g'' & \text{otherwise} \end{vmatrix} \quad \text{xiv}$$

$$b''_{clipped} = \begin{vmatrix} I_{Clip} & \text{if } b > I_{Clip} \\ 0 & \text{if } b < 0 \\ b'' & \text{otherwise} \end{vmatrix}$$

Gamma $$I_{Out} = I_{In}^{1/\gamma}$$

$$I'_{Out} = \begin{vmatrix} I_{Clip} & \text{if } I_{Out} > I_{Clip} \\ I_{Out} & \text{otherwise} \end{vmatrix} \quad \text{xv}$$

Other more involved gamma functions can of course be applied, but the principle of the LUT remains unchanged. Construction of a LUT for Clipping and Gamma combined. Clipping can be achieved using a 16-bit LUT by making use of the 2's compliment nature of negative integers stored in computers. The LUT is laid out as shown in FIG. 8.

The valid output 10 occupies a small fraction of the 64 Kbyte LUT. Why use such a large LUT if the valid output occupies only 256 bytes? The input value to the LUT can be negative and it can also be greater than 255, by using a 64K LUT arranged as shown a single array can be set up to handle all cases of valid, underflow and overflow.

Normally, this would not be possible as a negative array access is invalid. The alternative would be to add an offset in order to make negative values into positive values, but this would cost an addition (of the offset) per pixel. Instead, by casting the input pixel value to an unsigned short prior to lookup we wrap the negative values to the high values of the unsigned short value 12. It remains now to fill the valid portion of the LUT with values that implement a gamma correction value, and fill the negative area 12 with zeros, and fill the overflow region 14 with $I_{clip}$. It should be noted that larger bit-depths can be handled with this approach by increasing the size of each of the regions and squeezing the unused parts of the LUT.

Generally, gamma correction is implemented as an LUT in most reconstruction chains. However, the saving in computation by including the clipping is 2 tests per color channel, that is, 6 tests per pixel.

There is an additional shift operation per color channel per pixel as integer arithmetic is used throughout. For example, white-balance gains and matrix values are stored as the whole number part of value x 1024. This rescaling at the end of the processing (but prior to lookup) adds 3 shifts per pixel.

Computational Complexity of the Embodiment. The computational complexity in terms of number of operations will now be assessed. For this purpose operations will be split into two categories: 1) multiplications, and 2) data access, tests, additions, shifts, lookups and offset calculations.

It should also be noted that each implementation is likely to differ slightly from this count, so the figures presented here should be taken as an estimate. In addition, some conditions of the algorithm relating to saturated pixels can alter the computational complexity for a given scene. For example, a scene which is very badly over-exposed will take longer to colorize using quad than a scene that is well-exposed (few saturated pixels). On the whole it is the automatic-exposure control (AEC) algorithm's job to provide a well-exposed image. This is therefore assumed in the following calculation.

| Per Pixel Ops | Multiplications | Other Ops | Total Ops |
|---|---|---|---|
| Stats Gathering* | 1 (0) | 3 (0) | 4 (0) |
| Range Scaling | | 2 | 2 |
| Demosaic | | 11 | 11 |
| White-Balance + Matrix | 4.5 | 4 | 8.5 |
| Range Clipping and Gamma | | 9 | 9 |
| Image Traversal | | 5 | 5 |
| Total | 5.5 (4.5) | 34 (31) | 39.5 (35.5) |

*stats gathering is an insignificant overhead when using subsampling of 8 or 16 and can be treated as zero if subsampling is assumed.

Example Performance Figures. The table below shows the measured processing time for a VGA sized Bayer image (640×480) on a 2.6 GHz Pentium4 PC running Win2K with 512 MB of RAM. Also shown are estimated CPU loading figures for several specs of machine processing VGA sized images at 30 frames per second.

| VGA (640 × 480) | Per Frame 2.6 GHz P4 | 2 GHz P4 at 30 fps | 1.5 GHz P4 at 30 fps | 1 GHz P4 at 30 fps |
|---|---|---|---|---|
| Quad | 4.8 mS | 19% | 28% | 37.5% |

General Discussion. Modifications may be made to the foregoing embodiment within the scope of the present invention. The method of the invention may be implemented wholly or partially in hardware rather than software. For example, the image sensor will typically be formed by CMOS technology as part of a chip which also performs various image processing steps, and the present invention can be incorporated as hardware at the design stage.

The use of hardware is particularly applicable to digital still and video cameras with viewfinders, mobile phone cameras, and PDAs. In other situations, however, it will be convenient to implement the invention by software. One example of this is where the image sensor is used as a webcam or similar device in combination with a standard PC or other computer.

The invention makes it possible to perform software reconstruction of images at video rates (e.g., 30 fps) with the processing being carried out on a host general purpose computer, or on an embedded processor of sufficient power, because of the significantly reduced computational cost per pixel. This also offers considerable flexibility in an end product such as a web camera or streaming digital stills camera, as the reconstruction is carried out by software which can be easily updated, modified or enhanced as part of the camera's driver. On the other hand, in a hardware implementation the invention offers lower computation, and hence, lower operational power and smaller silicon design area, and thus lower cost per die.

That which is claimed:

1. A method of processing pixel image data comprising:
generating the pixel image data using a solid state image sensor comprising a color filter array of pixels producing three-component color signals for each pixel; and
operating an image processing apparatus coupled to the color filter array of pixels for
performing at least range scaling and demosaicing in a first single pass of the pixel image data, and
performing at least matrixing, range clipping and gamma correction in a second single pass of the pixel image data.

2. The method of claim 1, wherein performing the at least range scaling and demosaicing further comprises collecting white balance statistics in the first single pass; and wherein performing the at least matrixing, range clipping and gamma correction further comprises applying a white balance correction in the second single pass.

3. The method of claim 2, wherein the sample is between 1:4 and 1:16 linearly.

4. The method of claim 1, wherein the first pass is performed only on a sample of the pixel image data from selected pixels.

5. The method of claim 1, wherein the range scaling is performed using a look-up table as pixel values are retrieved for the demosaicing.

6. The method of claim 1, wherein the color filter array of pixels comprises a red/green/blue Bayer pattern; wherein the demosaicing is performed on quad blocks each containing two green, one red, and one blue pixel; and wherein a single red value is calculated and applied to all pixels of the quad blocks, and a single blue value is calculated and applied to all pixels of the quad blocks.

7. The method of claim 6, wherein the single red value is calculated as $(2r_1+r_2+r_3)/4$ where $r_1$ is a value from the red pixel within the quad blocks, and $r_2$ and $r_3$ are values from red pixels adjacent the quad blocks; and wherein the single blue value is calculated as $(2b_1+b_2+b_3)/4$ where $b_1$ is the value from the blue pixel within the quad blocks, and $b_2$ and $b_3$ are the values from blue pixels adjacent the quad blocks.

8. The method of claim 6, wherein performing the at least range scaling and demosaicing further comprises collecting white balance statistics in the first single pass; and wherein performing the at least matrixing, range clipping and gamma correction further comprises applying a white balance correction in the second single pass; wherein the white balancing and the matrixing are performed by a single operation; and wherein the single red and blue values are used in performing the white balancing and the matrixing.

9. The method of claim 8, wherein the white balancing and the matrixing is preceded by testing to determine whether clipping to a saturated value is required.

10. The method of claim 9, wherein the testing comprises testing each color component value of each pixel against a pre-calculated value for that color; and wherein the pre-calculated values are derived from white balance gain values.

11. The method of claim 1, wherein the clipping and the gamma correction are performed as a single operation by reference to a look-up table; and wherein the look-up table is organized such that negative input values wrap to high values of an unsigned short value.

12. An image processing apparatus for processing pixel image data produced by a solid state image sensor comprising a color filter array of pixels producing three-component color signals for each pixel, the apparatus comprising:

range scaling and demosaicing circuitry for receiving the pixel image data for performing range scaling and demosaicing in a first single pass of the pixel image data; and matrixing, range clipping and gamma correction circuitry for receiving an output of said range scaling and demosaicing circuitry for performing at least matrixing, range clipping and gamma correction in a second single pass of the pixel image data.

13. The image processing apparatus of claim 12, wherein said range scaling and demosaicing circuitry also collects white balance statistics from the image data; and wherein said matrixing, range clipping and gamma correction circuitry also applies white balance correction.

14. The image processing apparatus of claim 12, wherein said range scaling and demosaicing circuitry performs the first pass only on a sample of the pixel image data from selected pixels.

15. The image processing apparatus of claim 12, wherein said matrixing, range clipping and gamma correction circuitry performs the range scaling using a look-up table as pixel values are retrieved for the demosaicing.

16. The image processing apparatus of claim 12, wherein the color filter array of pixels comprises a red/green/blue Bayer pattern; wherein said range scaling and demosaicing circuitry performs the demosaicing on quad blocks each containing two green, one red, and one blue pixel; and wherein a single red value is calculated and applied to all pixels of the quad blocks, and a single blue value is calculated and applied to all pixels of the quad blocks.

17. The image processing apparatus of claim 12, wherein the single red value is calculated as $(2r_1+r_2+r_3)/4$ where $r_1$ is a value from the red pixel within the quad blocks, and $r_2$ and $r_3$ are values from red pixels adjacent the quad blocks; and wherein the single blue value is calculated as $(2b_1+b_2+b_3)/4$ where $b_1$ is the value from the blue pixel within the quad blocks, and $b_2$ and $b_3$ are the values from blue pixels adjacent the quad blocks.

18. The image processing apparatus of claim 17, wherein said range scaling and demosaicing circuitry further collects white balance statistics in the first single pass; wherein said matrixing, range clipping and gamma correction circuitry applies a white balance correction in the second single pass; wherein the white balancing and the matrixing are performed by a single operation; and wherein the single red and blue values are used in performing the white balancing and the matrixing.

19. An image sensing device comprising:
a color filter array of pixels for producing pixel image data, the pixel image data including three-component color signals for each pixel; and
an image processing apparatus coupled to said color filter array of pixels for processing the pixel image data, said image processing apparatus comprising
range scaling and demosaicing circuitry for receiving the pixel image data for performing range scaling and demosaicing in a first single pass of the pixel image data; and
matrixing, range clipping and gamma correction circuitry for receiving an output of said range scaling and demosaicing circuitry for performing at least matrixing, range clipping and gamma correction in a second single pass of the pixel image data.

20. The image sensing device of claim 19, wherein said range scaling and demosaicing circuitry also collects white balance statistics from the image data; and wherein said matrixing, range clipping and gamma correction circuitry also applies white balance correction.

21. The image sensing device of claim 19, wherein said range scaling and demosaicing circuitry performs the first pass only on a sample of the pixel image data from selected pixels; and wherein said matrixing, range clipping and gamma correction circuitry performs the range scaling using a look-up table as pixel values are retrieved for the demosaicing.

22. The image sensing device of claim 19, wherein said color filter array of pixels comprises a red/green/blue Bayer pattern; wherein said range scaling and demosaicing circuitry performs the demosaicing on quad blocks each containing two green, one red, and one blue pixel; and wherein a single red value is calculated and applied to all pixels of the quad blocks, and a single blue value is calculated and applied to all pixels of the quad blocks.

23. The image sensing device of claim 22, wherein said range scaling and demosaicing circuitry further collects white balance statistics in the first single pass; wherein said matrixing, range clipping and gamma correction circuitry applies a white balance correction in the second single pass; wherein the white balancing and the matrixing are performed by a single operation; and wherein the single red and blue values are used in performing the white balancing and the matrixing.

24. The image sensing device of claim 19, wherein said color filter array of pixels and said image processing apparatus are configured as part of at least one of a web cam, a digital still camera, a video camera, a mobile telephone and a personal data assistant (PDA).

25. A computer-readable storage medium having computer-executable instructions stored thereon for causing an image processing apparatus to process pixel image data produced by a solid state image sensor comprising a color filter array of pixels producing three-component color signals for each pixel, the computer-executable instructions for causing the image processing apparatus to perform steps comprising:
performing at least range scaling and demosaicing in a first single pass of the pixel image data; and
performing at least matrixing, range clipping and gamma correction in a second single pass of the pixel image data.

26. The computer-readable medium of claim 25, further comprising:
collecting white balance statistics in the first single pass; and
applying a white balance correction in the second single pass.

27. The computer-readable medium of claim 25, wherein the first pass is performed only on a sample of the pixel image data from selected pixels; and wherein the range scaling is performed using a look-up table as pixel values are retrieved for the demosaicing.

28. The computer-readable medium of claim 25, wherein the color filter array of pixels comprises a red/green/blue Bayer pattern; wherein the demosaicing is performed on quad blocks each containing two green, one red, and one blue pixel; and wherein a single red value is calculated and applied to all pixels of the quad blocks, and a single blue value is calculated and applied to all pixels of the quad blocks.

29. The computer-readable medium of claim 28, further comprising collecting white balance statistics in the first single pass; and applying a white balance correction in the second single pass; wherein the white balancing and the matrixing are performed by a single operation; and wherein the single red and blue values are used in performing the white balancing and the matrixing.

* * * * *